Patented June 21, 1938

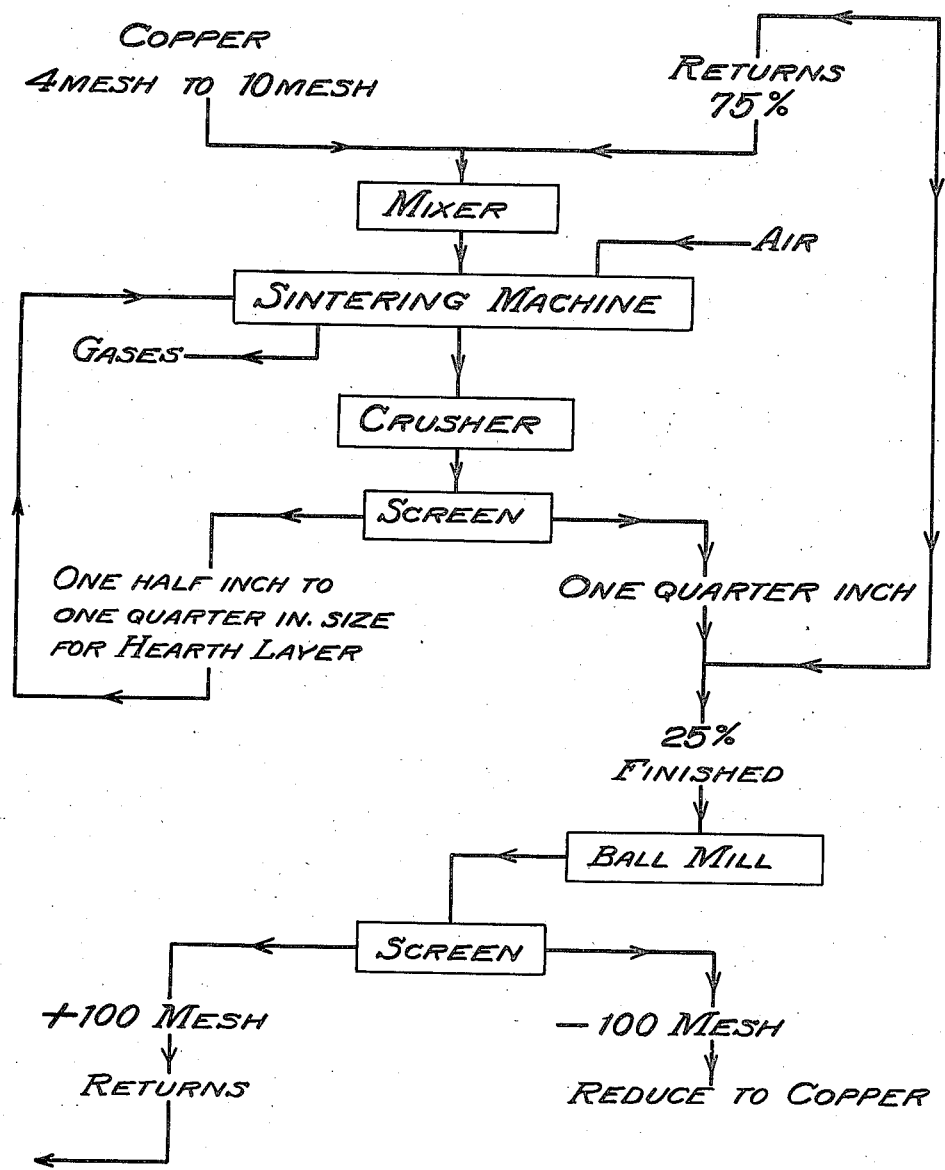

2,121,602

UNITED STATES PATENT OFFICE 2,121,602

PROCESS OF MAKING COPPER OXIDES

Richard L. Lloyd, Great Neck, N. Y., and Reed W. Hyde, Summit, N. J.; Stella Warde Lloyd, executrix of said Richard L. Lloyd, deceased, assignors to Dwight & Lloyd Sintering Company, Inc., New York, N. Y., a corporation of Delaware Application January 18, 1935, Serial No. 2,330

5 Claims. (Cl. 23—148)

Our invention relates to a process of making metal oxides of a definite quality, that is, of a required degree of purity and of a definite character, as for example, such as may be crushed to narrow size limits and of a definite density.

For certain uses the purity, size, density and other qualities of a metal oxide must be held within such close limits that the ordinary commercial grades of material heretofore available will not meet the requirements. An example is the oxide powder required to make powdered metallic copper for use in making bearings, brushes, etc. Such powder must be within certain size and density limits and must be substantially free from impurities.

The oxide of the required qualities may be made by oxidizing copper of sufficient purity to the oxide by an air blast. While surface oxidation of metal particles is easily accomplished, a complete conversion is quite difficult because oxidation proceeds slowly at low temperatures and as the melting point of copper and other low melting metals is relatively low, the melting point is approached before the oxidation reaction becomes rapid. However, if fusion of metal takes place, the surface area exposed to oxidation is relatively small and this limits and slows down the oxidation of the metal.

Our present method, however, provides a process whereby oxidation may take place at temperatures approaching the melting point of the metal and, therefore, at a rapid rate, while maintaining a large surface area of the metal exposed to the oxidizing air.

In our invention, fine metal particles, such as shot, small punchings, granulated metal, are mixed with crushed oxide particles prepared in a preliminary oxidation or in previous runs of the process to form a mass that is permeable to air so that the extended surfaces afforded by the small particles are readily accessible to the air. The proportions of oxide and metal are selected to produce a mixture that will support combustion under the given operating conditions when brought to a temperature sufficient to ignite the mixture. In some cases, the heat of oxidation of metal itself will suffice for this purpose, particularly when finely divided metal particles are used, but in case of metals having a low heat of oxidation or with coarse particles, additional heat from an outside source may have to be supplied. The mixture may be moistened sufficiently to cause the particles to properly adhere. The mixture is then spread in a permeable bed on a porous support so that air may be passed through it. Heat is applied from an outside source to an exposed surface, preferably the upper surface of the bed to bring it quickly as a whole to a temperature sufficient to cause rapid and self-sustained combustion of the metal and, thereupon, currents of oxidizing gases are passed through the bed so as to carry heat from the ignited surface or portion into the next adjoining layers or portions of the mixture.

The temperature to which the surface of the mixture is heated may approach or even reach the melting point of the metal, but does not cause a fusion or melting of the metallic particles sufficient to destroy their extended surfaces because of the physical, mechanical and chemical effects of the admixed oxides. If necessary, the application of external heat may be prolonged to maintain the desired temperature for a longer period while the oxidizing gases are passed through the bed. This may be desirable particularly when the charge contains coarse particles of metal to be oxidized. Accordingly, the air penetrates rapidly and uniformly into the small metallic particles, rapidly oxidizing them in a progressive layer or stratum which progresses from the surface or place of ignition to the opposite surface until the entire bed is oxidized.

The particles of metallic oxide admixed with the particles of metal to be oxidized serve to prevent a melting or fusion of the mass as a whole and thus, as well as by physical, mechanical and chemical action, maintain its permeability to the air. A mass is provided in which the heat generated by oxidation is moderated and kept under control. If any particles should become molten, agglomeration with other particles is prevented by the intervening particles of metallic oxides as well as by the rapid oxidation of the surface of the particles that may become fused. Thus the air passages through the bed of material are maintained open at all times so that fresh oxygen is continuously brought into contact with the hot metal particles until they are completely oxidized. After the oxidation is completed, the resulting cake forms a mass of oxide, fused into spongy, cellular form that is rather dense, but comparatively brittle and easily crushed to size.

The process enables overheating to be avoided by controlling the proportions of oxide in the bed and the rate of supply of air thereto. With finer particles the action tends to proceed more rapidly with a consequent danger of fusion. This may be counteracted by reducing the speed of the air currents through the bed, by mixing more crushed oxide with the metal particles, and by decreased preliminary heating or ignition. The heating effect will also depend to some extent upon the thickness of the bed and the radiation losses. As these various factors differ somewhat between different metals and different operating conditions, the proportions of oxide will vary for different metals and different size of particles, but may be readily and quickly adjusted at given conditions.

An example of the process as applied to the formation of a copper oxide suitable for reduction to metallic copper powder for use in forming bearings is given below, by way of example, and outlined in the flow sheet shown in the accompanying drawing.

In this example, "shot" copper, 93% of which passed a 150 mesh screen and all of which passed a 10 mesh screen, was mixed with crushed oxide, all of which passed a 4 mesh screen, obtained from a previous operation and in the proportions of one part of copper to three parts of oxide.

This mixture was moistened and put in a bed to a depth of four inches on suitable grates, such as, for example, a Dwight & Lloyd sintering machine, and heated for eight minutes until the top reached an incipient fusion temperature. Air currents were drawn through the bed during the preliminary heating and for a further period of eight minutes. A draft under a difference of pressure of ten inches of water, or a ten inch vacuum, produced a sufficient air current for this purpose. At the end of this reaction the resulting cake was quenched and formed a dense oxide containing only about two per cent of metallic copper, this being the residue of coarse metallic particles. This product when crushed to 92½% minus 150 mesh was freed of metal particles by screening and was reduced under suitable conditions to a correspondingly fine metallic powder.

Where a product of a high degree of purity is required such that contamination, such as scale, from grate bars, must be avoided, it is advisable to place a layer of crushed oxide products on the grates and along the ends of the pallets before placing the charge thereon, so that the charge is isolated. This coarse oxide layer absorbs the heat from the charge so that the grate bars and pallets do not get hot enough to form scale and contaminate the product.

It will be noted that the heat required in the operation is supplied largely by the metal itself, only a small proportion of fuel being required for the preliminary heating or ignition. The size of the metal particles may vary considerably, being preferably minus 10 or 20 mesh. Particles coarser than 10 mesh are more slowly oxidized, but can readily be used. When the resulting product is crushed to pass a 100 mesh screen and screened, the oversize will include the unoxidized metal cores and is returned to the next batch for re-treatment. This metal core will then be oxidized.

While the process has been described specifically for the oxidation of copper, it will be understood that it may be used for the oxidation of alloys of copper or of other metals and/or a mixture of metals and alloys with oxides.

The product made by the above steps in the example given was the red cuprous oxide. The most satisfactory powdered copper for the manufacture is made from a mixture of cuprous and cupric oxides. We may obtain any desired mixture or proportion of cuprous and cupric oxides by further oxidizing the above product. This is done by simply heating it in air. For this purpose the sinter cake is preferably crushed to pass a 4 mesh screen, then placed on a pervious support and heated by a flame while passing hot air therethrough. By this forced action the oxidation is rapid and can be carried to any degree desired.

A convenient way of carrying out this additional oxidation is to place the crushed sinter, after being slightly moistened, on the pallet of a sintering machine in a layer. The air above the layer and enclosed within a refractory roof is heated as by means of gas burners above the bed and with a provision for the entrance of excess air. A suction fan below the bed draws air downwardly therethrough to bring about the secondary oxidation. Any suitable apparatus may be used such, for example, as the calcining apparatus shown in Patent 1,810,313.

The copper product obtained by the second oxidation in the above described process differs from that heretofore obtainable. Its color is maroon to deep red, depending upon the extent of oxidation, whereas the copper oxides heretofore obtainable as, for example, from copper scale, have been black in color being composed of cupric oxide although sometimes containing particles or surfaces of unoxidized copper with their characteristic copper color. The particles of the product of the above process are translucent showing a ruby red color by transmitted light and, by reflected light, a color varying from ruby red to black, depending upon lighting. This is in contrast to the copper oxide scale which is black and opaque.

Individual grains of our product as seen under a microscope are of a rounded or bulky appearance as distinguished from the flat scale-like appearance of copper oxide scale and frequently show a concoidal fracture, resembling crushed glass in this respect.

Under microscopic examination the grains of copper oxide sinter re-oxidized as described above, are found to consist of a core of unaltered cuprous oxide with an outer shell of black cupric oxide. The thickness of the outer shell of black cupric oxide depends upon the length of the re-oxidation treatment. A treatment less than twenty minutes at a low red heat on a bed four inches deep gives a depth of cupric oxide shell of about $\frac{1}{32}$ of an inch. The proportion of cupric oxide to cuprous oxide can, therefore, be regulated by suitably proportioning the time of treatment, the temperature and the grain size of the original crushed sinter so that any desired proportion of cupric and cuprous oxides may be obtained.

The specific gravity is upwards of 6 and ranges around 6.2, while the apparent density is greater than about 3.25, a typical example being a product with an apparent density of 3.44 on particles screened through 100 mesh.

Our product is one particularly adapted for reduction to form metallic powder and can, for this purpose, be brought to any desired degree of oxidation before being reduced.

Mixed metals can be treated to produce a highly oxidized product suitable for treatment or treatments designed to separate and reclaim the metals ad seriatim.

What we claim is—

1. A process of oxidizing metallic copper to copper oxide by the action of air, which comprises mixing particles of metallic copper with particles of copper oxide, forming the mixture into a permeable bed, heating a surface of said bed to the fusing temperature of the metal, and passing air through said surface and thence through said bed to oxidize the metallic copper by the oxygen of the air at said fusing temperature without melting said bed to a mass impermeable to said air.

2. A process of oxidizing metallic copper to copper oxide by atmospheric oxygen, which comprises mixing particles of metallic copper with particles of copper oxide to form a mass permeable to air, forming said mass into a bed permeable to air, heating the upper surface of said bed to the fusing temperature of the metallic copper, and passing air downwardly through said bed at a rate sufficient to cause oxidation of the metal thereof without a general fusion of said bed.

3. The process of claim 1 in which the proportions of metal to oxide are as 1 to 3.

4. The process of claim 1 in which the oxidation is repeated with a part of the product and added quantities of metal.

5. A process of oxidizing metallic copper with the oxygen of the atmosphere, which comprises mixing particles of metallic copper with particles of copper oxide, forming said mass into a bed permeable to the air, heating the upper surface of said bed to the fusion temperature of the metallic copper, passing a current of air downwardly through said bed to cause oxidation of the metallic copper by the oxygen of the air and at a rate sufficient to form a sinter cake without a general fusion of said bed, crushing said sinter cake to coarse particles, and further oxidizing said particles in a permeable bed.

RICHARD L. LLOYD.
REED W. HYDE.